US007028131B1

(12) United States Patent
Williams

(10) Patent No.: US 7,028,131 B1
(45) Date of Patent: Apr. 11, 2006

(54) REVERSE MESSAGE WRITES AND READS

(75) Inventor: James B. Williams, Lowell, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 362 days.

(21) Appl. No.: 10/422,581

(22) Filed: Apr. 23, 2003

Related U.S. Application Data

(60) Provisional application No. 60/421,308, filed on Oct. 24, 2002.

(51) Int. Cl.
*G06F 13/00* (2006.01)
(52) U.S. Cl. .......................... 710/310; 710/52
(58) Field of Classification Search ................ 710/310, 710/52, 53, 56
See application file for complete search history.

(56) References Cited

U.S. PATENT DOCUMENTS

| | | | | |
|---|---|---|---|---|
| 5,870,551 | A | * | 2/1999 | Ozden et al. ................. 710/56 |
| 5,974,516 | A | * | 10/1999 | Qureshi ........................ 710/52 |
| 6,311,259 | B1 | * | 10/2001 | Boyer et al. ................... 710/52 |
| 6,536,670 | B1 | * | 3/2003 | Postman et al. ............ 235/487 |
| 6,892,278 | B1 | * | 5/2005 | Ebergen ...................... 711/118 |
| 2002/0112105 | A1 | * | 8/2002 | Daniel et al. ................ 710/112 |
| 2004/0052135 | A1 | * | 3/2004 | Le ............................. 365/202 |

OTHER PUBLICATIONS

"Virtual Interface Architecture Specification," Version 1.0, Dec. 16, 1997, ©1997 Compaq Computer Corp., Intel Corporation, Microsoft Corporation; pp. 1-83.
Technology Brief, Virtual Interface Architecture for System Area Networks, Fourth Edition (Jun. 1999) 0184-0699-A, Conpaq Computer Corporation, Prepared by ISSD Technology Communications, TechCom@compaq.com, pp. 1-14.
"VI/TCP (Internet VI)," Network Working Group, Internet-Draft, Expires Jan. 2001; by S. DiCecco, J. Williams, GigaNet, Inc., Jul. 14, 2000, Internet Engineering Task Force (IEFT), http://www.ietf.org/lid-abstracts.txt, pp. 1-19.
"VIDF Virtual Interface (VI) Architecture Developer's Guide," Revision 1.1 Draft; Sep. 26, 2000; © Intel Corporation 1998. 1999, 2000; pp. 1-99.

* cited by examiner

*Primary Examiner*—Glenn A. Auve
(74) *Attorney, Agent, or Firm*—Morrison & Foerster LLP

(57) ABSTRACT

A system, method, software and firmware configured to write a message comprising a plurality of words into a memory, such that a last word of the message is written first at a first memory address and a first word of the message is written last at a memory address higher than the first memory address. The system may comprise two software applications sending messages to each other via a bus, such as a PCI bus.

26 Claims, 2 Drawing Sheets

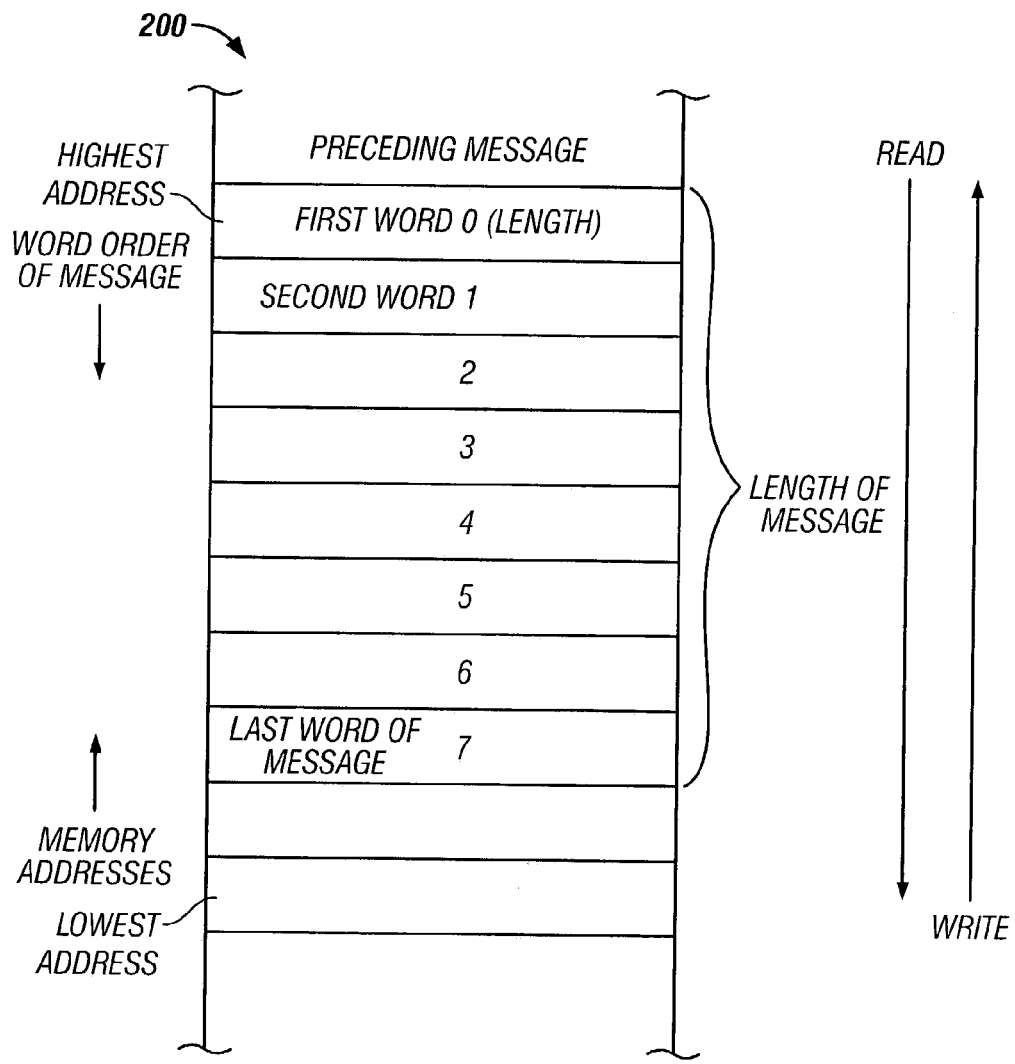

US 7,028,131 B1

REVERSE MESSAGE WRITES AND READS

CLAIM OF PRIORITY

The present application claims priority to co-assigned U.S. Provisional Patent Application No. 60/421,308, entitled "REVERSE MESSAGE READS FOR EFFICIENT PCI TRANSFERS," filed on Oct. 24, 2002, which is hereby incorporated by reference.

BACKGROUND

A device or application executed by the device may transfer a message to another device via a bus, such as a Peripheral Component Interface (PCI) bus. The first device may have a memory to store messages to be transferred to the second device via the bus. The second device may have a memory to store messages transferred from the first device via the bus.

SUMMARY

The application relates to methods, systems, software, firmware and/or hardware for reverse message writes and reads. As an example, firmware source code of a host bus adapter (HBA) may implement the reverse message writes and reads.

The system may have a number of advantages. For example, the system may efficiently transfer variable length messages across a bus, such as a PCI bus, and notify a receiving device or application that a transferred message is complete and ready to process. The system may "write" a message with a single PCI transaction and avoid PCI "read" transactions. A reduction in PCI transactions may improve network efficiency and throughput.

The system may also provide automatic synchronization by writing a first word of a message last in sequence of words to a receiving buffer. The first word may contain a length of the message. When the first word is received and stored in the buffer, a device (or firmware executed by the device) acknowledges that the message is completely received and ready for processing. The device may begin processing a message when the message is completely received. In contrast, if the first word (with the message length) is written first, the device will not know if the rest of the message has been received and when the message will be complete.

An aspect of the application relates to a system comprising a first software application and a second software application. The first software application is configured to write a message in reverse order to a memory, such that a last word of the message is written first to a first memory address and a first word of the message is written last to a memory address higher than the first memory address. The second software application is configured to read the message from the first word to the last word.

Another aspect relates to a method of writing a message comprising a plurality of words into a memory, such that a last word of the message is written first at a first memory address and a first word of the message is written last at a memory address higher than the first memory address.

The details of one or more embodiments are set forth in the accompanying drawings and the description below. Other features and advantages will be apparent from the description and drawings, and from the claims.

DESCRIPTION OF DRAWINGS

FIG. 2 is a more detailed view of a message in a message queue in FIG. 1.

FIG. 3 illustrates a method of a reverse message write and read.

Like reference symbols in the various drawings indicate like elements.

DETAILED DESCRIPTION

Figure 1:
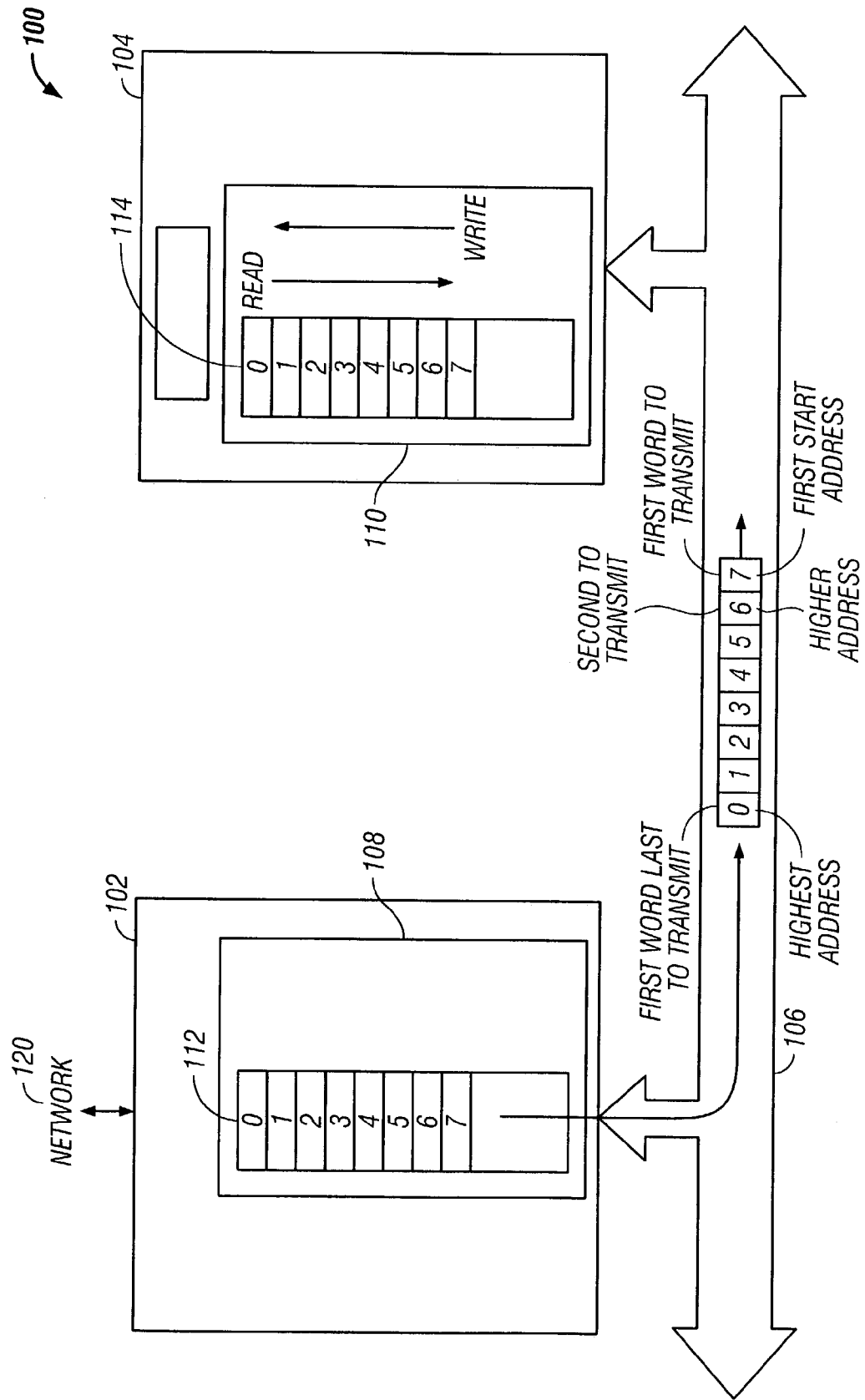
FIG. 1 illustrates a system with at least two devices coupled to each other via a bus.

FIG. 1 illustrates a system 100 with at least two devices 102, 104 coupled to each other via a bus 106. The bus 106 may be a Peripheral Component Interface (PCI) bus. The devices 102, 104 may be any device configured to receive and/or transmit data via the bus. The devices 102, 104 may be, for example, a host bus adapter (HBA), a network interface card (NIC), a plug-in PCI card, a disk controller, a video card, a graphics card, an audio card, or a host system, such as a server.

Each device 102, 104 includes a memory 108, 110 with at least one buffer or circular queue 112, 114. Each queue 112, 114 may store one or more messages to be transferred across the bus 106 and/or one or more messages received across the bus 106. An HBA and a host may be modeled as devices 102 and 104 and each may have a circular message queue 112.

The messages may have variable lengths, i.e., a variable number of words. Each word may have, for example, 8 bits, 32 bits or any suitable number of bits. The messages may include, for example, commands, control information or interrupts. A specific example of a message is an indication of a completed transfer of data by the device 102 (e.g., an HBA) to a network 120 (e.g., Fibre Channel, Small Computer System Interface (SCSI), iSCSI, TCP/IP, Virtual Interface (VI) over IP). The data transfer may involve a Virtual Interface (VI) over Transmission Control Protocol/Internet Protocol (TCP/IP) packet transfer. The message may include a word that identifies a particular VI, and a second word that identifies a type of completion.

Each device 102, 104 may have a processor that executes software applications or firmware that read and/or write variable length messages to the queues 112, 114. For example, an event queue 114 with variable length messages may be a command queue in a NIC or an interrupt queue in a host system. Firmware executed by the receiving device 104 may poll the next entry in the queue 114 (determined by a pointer) to see if there is a message to process.

The following description assumes the device 102 (or an application executed by device 102) is a message-transmitting device, and the device 104 (or an application executed by device 104) is a message-receiving device.

For certain applications, an application run by the receiving device 104 should receive the complete message with multiple words in the queue 114 before the application may begin to process the message. Thus, the receiving device 104 should know when an entire message has been received. This may be complicated with variable length messages and no invalid bit combinations at the end of a message.

Another limitation to improve efficiency may be to "write" a multi-word message from a first device 102 to a second device 104 in a single bus (e.g., PCI) transaction and avoid "reads" across the bus 106 (e.g., PCI bus).

A method that attempts to address the above limitations may use an interrupt to notify the receiving device 104 that a message is ready to process. But the interrupt does not notify the receiving device 104 of how many messages are in the queue 114 or how many words are in each message.

Another method may write an entire message to the receiving device memory 110, except for the first word of the message, then return to write the first word. The first word may contain a length of the message. The receiving device 104 polls for the first word. This method may require two PCI transactions to write the message without the first word and then write the first word. It may be more efficient to have a single PCI transaction to write a message from one device 102 to another device 104 and avoid two PCI transactions.

Another method may try to put a length field in the last word of a message. But it may be impractical to put a length field in the last word of a variable length message because firmware may not know which word is the last word of a variable length message.

Another method may make all messages of equal length with a valid indication at the end of each message. The receiving device 104 polls the end of the message to guarantee that the entire message is available at the receiving device 104 before processing the message. But this method is not practical for devices, software or firmware that use variable length messages.

In another method, the transmitting device 102 writes the message to the receiving device 104 starting with a last word and ending with a first word of the message. But this method would require a PCI transaction for each word of a multi-word message. Certain buses, such a PCI bus, only work efficiently when the data transfers are in order of ascending/increasing numerical memory addresses. A PCI transfer works by providing a PCI bus with a starting address and a desired amount of data at incrementally higher addresses from the starting address, e.g., transfer word at address 0 first, then word at address 1, address 2, address 3, etc.

A solution to the issues described above is to write a message from the end of the message to the beginning of the message in ascending numerical (logical or physical) memory address order to the receiving event queue 114. Transferring words in ascending address order conforms with a guideline of the PCI bus 106. The end (last word) of a message is written first. The beginning (first word) of a message is written last. Thus, the device 102 writes in "reverse order" to the queue 114, in contrast to a conventional write operation that writes the beginning of a message first in ascending address order.

The device 104 reads the message in the event queue 114 in order of decreasing addresses starting with the first word (word 0) with the length field. The write and read directions are shown by arrows in FIGS. 1 and 2.

FIG. 2 illustrates is a more detailed view 200 of a message in a message queue 112, 114 in FIG. 1. As an example, the device 102 (or an application run by the device 102) wants to transfer and write an eight-word message to the queue 114 of the device 104. The device 102 first transfers the last word in a message, word 7, which has the lowest address in queue 112, across the bus 106. The device 102 then transfers the next-to-last word, word 6, which has a higher address than word 7.

As the device 104 receives the words of the message, the device 104 first writes the last word of the message, word 7, at an address in the queue 114. Then the device 104 writes the second to last word of the message, word 6, at a higher address in the queue 114. The first word, word 0, may contain a length field that specifies the length of the message.

When the first word is received and stored in the queue 114, the device 104 (or firmware executed by the device 104) acknowledges that the message is completely received and ready for processing. The application or firmware will know if a message is complete in the queue 114 because the first word (written last) has been received.

When the device 104 starts to read a message in the queue 114, the device 104 knows the beginning of a message is next to the end of a preceding message. The device 104 reads the first word of the message, word 0, which may include a length field so the device 104 knows how long the message is. Some applications or firmware executed by the receiving device 104 may need to know the length of a variable-length message and may expect to find the length of a message in the first word (word 0) of the message.

FIG. 3 illustrates a method of a reverse message write and read.

The method described above may apply to message transfers from an HBA to a host or from a host to an HBA. The method described above may be implemented by software or firmware with an array pointer and negative subscripts in the array to force a negative (descending address) order for "reads."

If the receiving device 104 is an HBA, it may periodically check the queue 114 for messages. If the receiving device 104 is a host, it may wait for an interrupt from an HBA to check the queue 114 for messages.

After the receiving device 104 processes a message, the receiving device 104 may erase the message by writing all zeros in the entries of the queue 114 where the message was stored. The receiving device 104 may then check the queue 114 and determine whether any new messages have been entered into the queue 114.

A number of embodiments have been described. Nevertheless, it will be understood that various modifications may be made without departing from the spirit and scope of the application. For example, the described methods may be applied to a SLI interface. The described methods may be applied to any two software/firmware applications, such as a host application and an HBA application, that communicate with each other through a shared memory. Accordingly, other embodiments are within the scope of the following claims.

What is claimed is:

1. A computer system comprising a host processor and one or more memories, the one or more memories further comprising:
   a first software application; and
   a second software application, the first software application being configured to write a message in reverse order to a first memory from the one or more memories, such that a last word of the message is written first to a first memory address specifying a location in the first memory and a first word of the message is written last to a second memory address specifying a location in the first memory higher than the first memory address, the second software application being configured to read the message from the first word to the last word.

2. The system of claim 1, wherein writing the first word last into the first memory notifies the second software application that the message is complete.

3. The system of claim 1, wherein the first software application writes the message in a circular buffer in the first memory.

4. The system of claim 1, further comprising a host bus adapter executing the first software application.

5. The system of claim 1, further comprising a host bus adapter executing the second software application.

6. The system of claim 1, wherein the host processor executes the first software application.

7. The system of claim 1, wherein the host processor executes the second software application.

8. The system of claim 1, wherein the message relates to a completion of a data transfer across a network.

9. The system of claim 1, further comprising a Peripheral Component Interface (PCI) bus configured to transfer the message from the first software application to the first memory.

10. The system of claim 1, further comprising a network interface card (NIC) executing at least one of the first software application or the second software application.

11. The system of claim 1, further comprising a plug-in PCI card executing at least one of the first software application or the second software application.

12. The system of claim 1, further comprising a disk controller executing at least one of the first software application or the second software application.

13. The system of claim 1, further comprising a video card executing at least one of the first software application or the second software application.

14. The system of claim 1, further comprising a graphics card executing at least one of the first software application or the second software application.

15. The system of claim 1, further comprising an audio card executing at least one of the first software application or the second software application.

16. The system of claim 1, further comprising:
an adapter executing at least one of the first software application or the second software application; and
a network coupled to the adapter.

17. A device comprising a device memory,
the device memory comprising a firmware application executable by a processor, and a message stored in reverse order so that the first word of the message has a higher memory address in the device memory than the last word of the message,
the firmware application being configured to store the message in reverse order in a destination memory such that a last word of the message is stored at a first memory address and a first word of the message is stored last at a memory address higher than the first memory address, the storing being performed without reversing the order of the message.

18. The device of claim 17, further comprising a connection to a Peripheral Component Interface (PCI) bus, the device being configured to transfer messages to another firmware application via the bus.

19. The device of claim 17, further comprising a connection to an Ethernet network.

20. The device of claim 17, wherein the destination memory is comprised by a destination device, which is configured to read the message in normal order so that the destination device reads the first word of the message first and the last word of the message last.

21. A computer readable media comprising a firmware application executable by a processor, the firmware application being configured to:
copy a message comprising a plurality of words from a source memory into a destination memory, such that a in the source memory the message is stored in reverse order so that the first word of the message has a higher memory address in the device memory than the last word of the message and in the destination memory the message is stored in reverse order, so that a last word of the message is written first at a first memory address and a first word of the message is written last at a memory address higher than the first memory address.

22. A method comprising:
providing a message comprising a plurality of words a source memory, the message being stored in reverse order in the source memory so that the first word of the message has a higher memory address in the source memory than the last word of the message
copying the message in a destination memory in reverse order so that the last word of the message is written first at a first memory address and the first word of the message is written last at a memory address higher than the first memory address, the copying step being performed without reversing the order of the message.

23. The method of claim 22, further comprising the step of reading the message.

24. The method of claim 23, wherein writing the message comprises writing into a circular queue.

25. The method of claim 23, further comprising determining when the message has been completely written into the memory by examining a message length field in the first word of the message.

26. The method of claim 22 further comprising reading the message from the destination memory in normal order so that the first word of the message stored at a higher memory address is read first and the last word of the message stored at a lower memory address is read last.

* * * * *